Feb. 4, 1941.  C. MÜNCH  2,230,307
METHOD OF FILTERING SOLUTIONS AND APPARATUS THEREFOR
Filed June 22, 1938  5 Sheets-Sheet 1
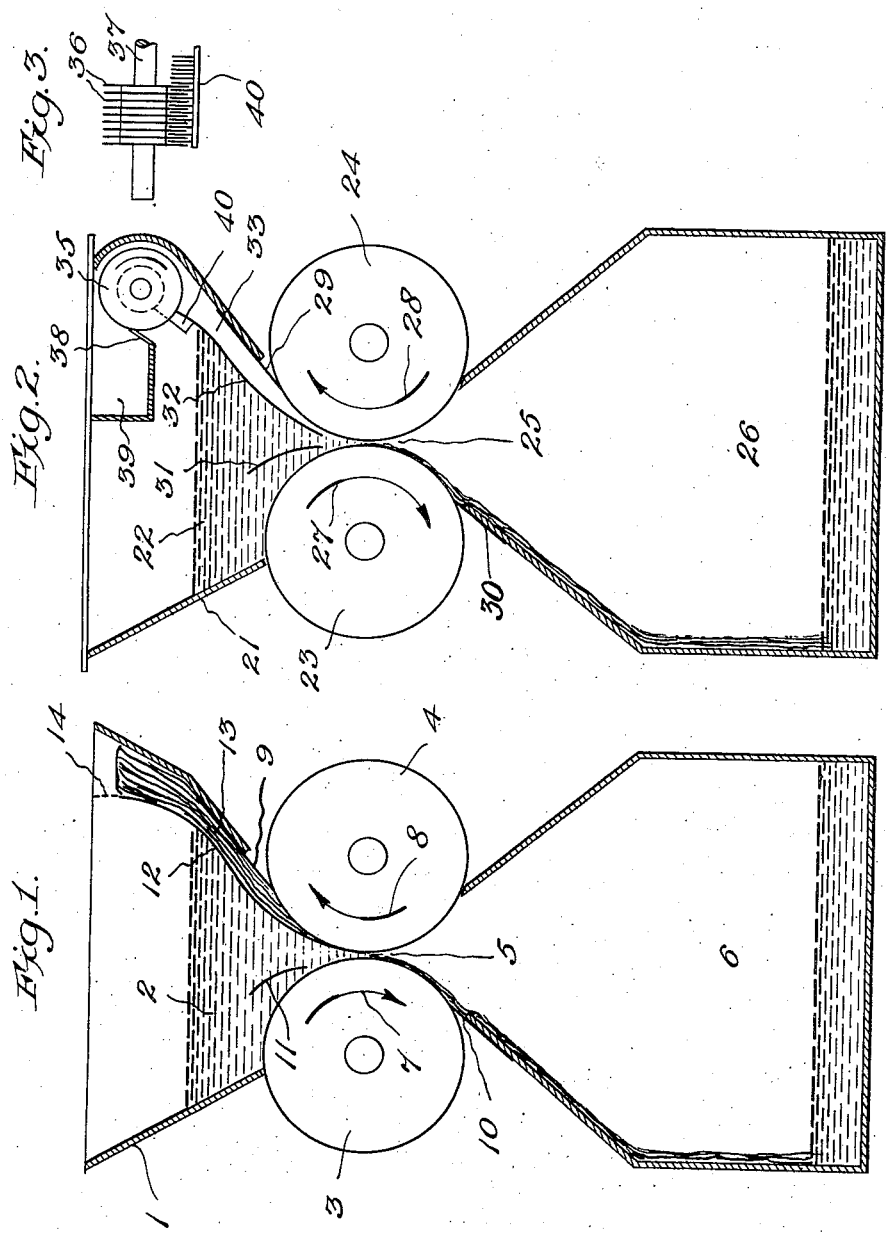
INVENTOR
CARL MÜNCH
BY
A. B. Deller
ATTORNEY Feb. 4, 1941.  C. MÜNCH  2,230,307
METHOD OF FILTERING SOLUTIONS AND APPARATUS THEREFOR
Filed June 22, 1938    5 Sheets-Sheet 2
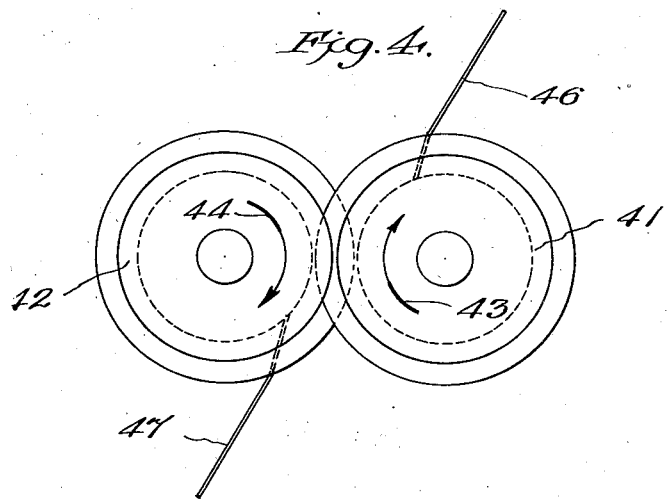
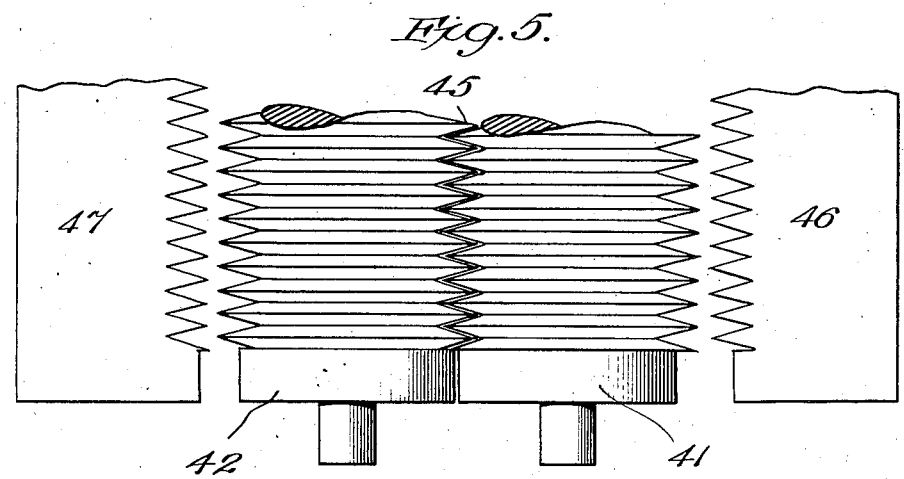
INVENTOR
CARL MÜNCH
BY
ATTORNEY

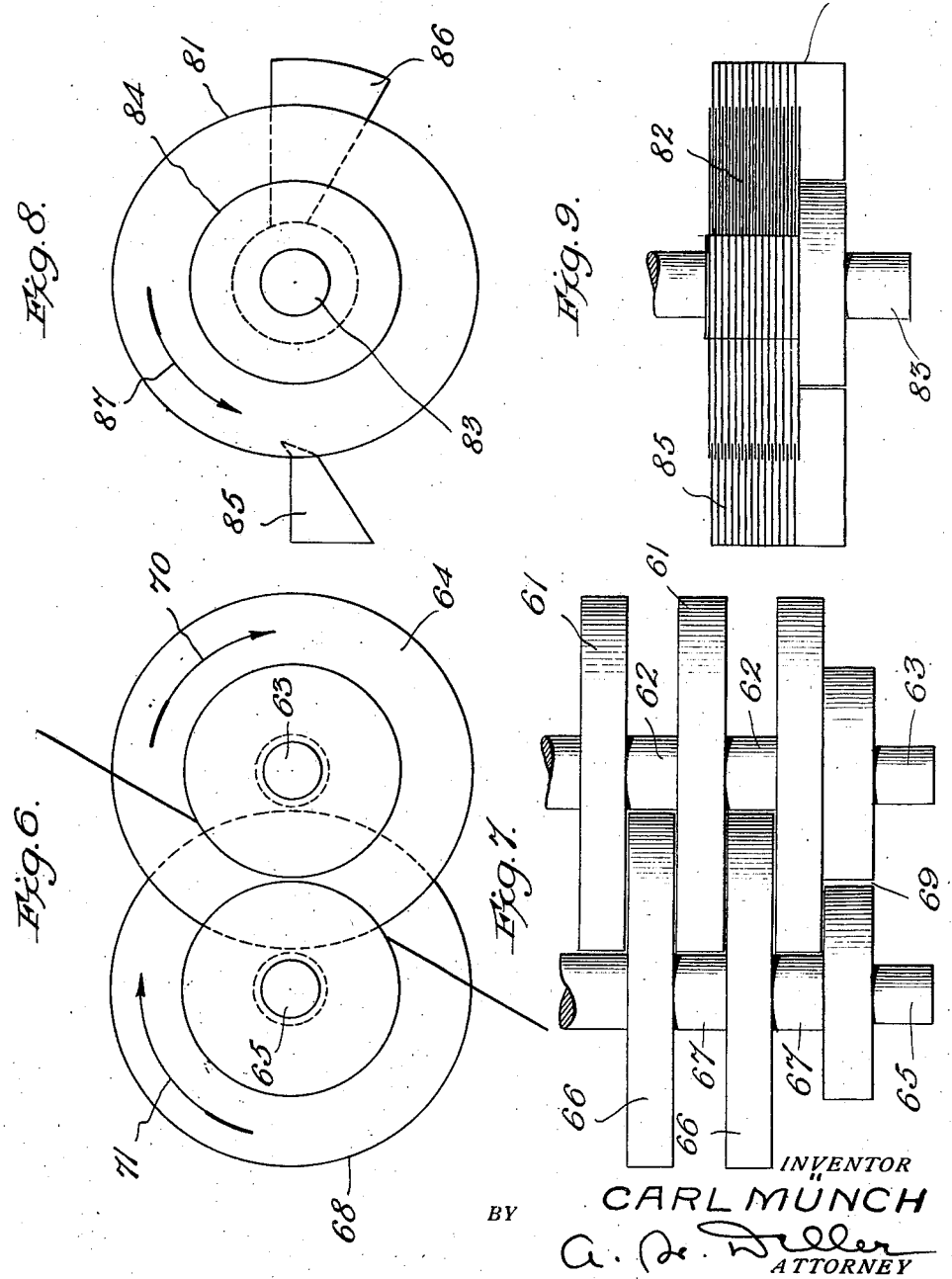

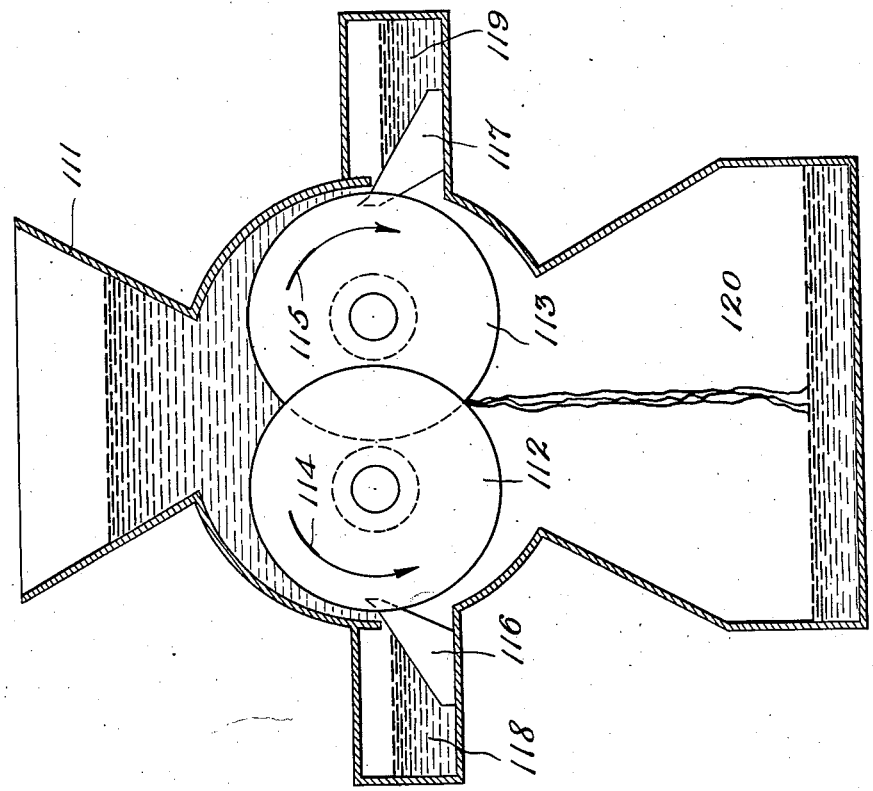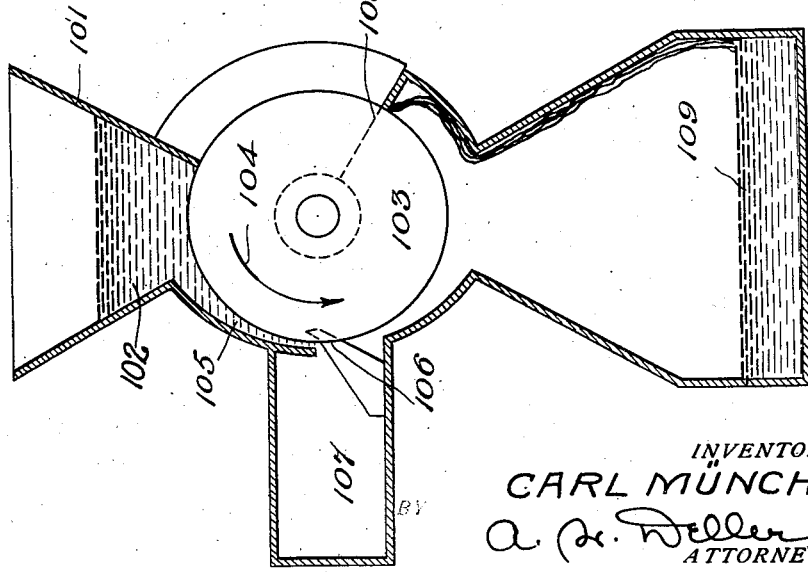

Feb. 4, 1941.  C. MÜNCH  2,230,307
METHOD OF FILTERING SOLUTIONS AND APPARATUS THEREFOR
Filed June 22, 1938  5 Sheets-Sheet 5
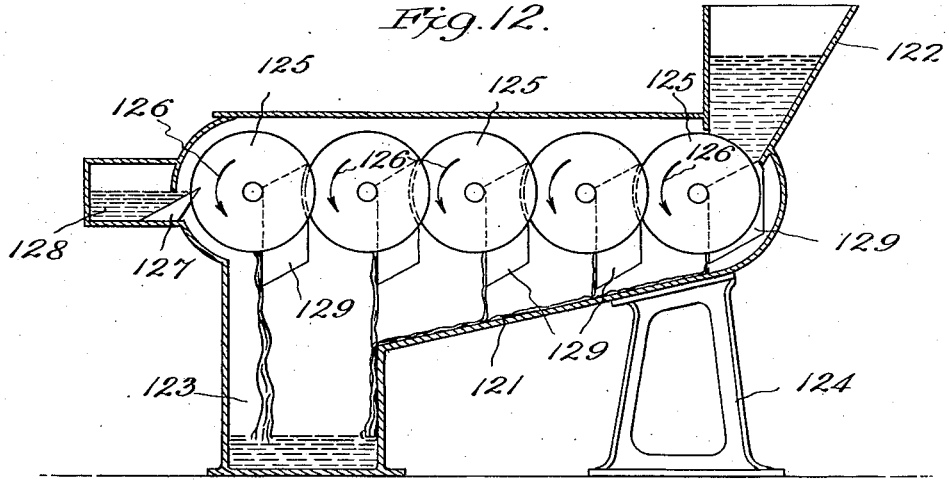
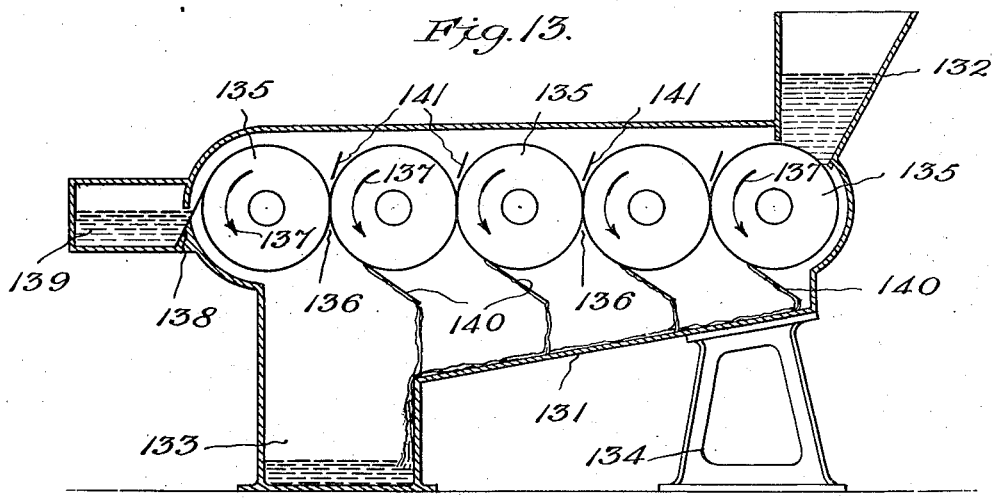
INVENTOR
CARL MÜNCH
BY
ATTORNEY Patented Feb. 4, 1941

2,230,307

UNITED STATES PATENT OFFICE 2,230,307

METHOD OF FILTERING SOLUTIONS AND APPARATUS THEREFOR

Carl Münch, Leipzig, Germany

Application June 22, 1938, Serial No. 215,143
In Germany June 26, 1937

12 Claims. (Cl. 210—62)

The present invention relates to a method of filtering solutions, and, more particularly, to a novel method of filtering solutions containing particles of pigments or other similar particles, and to an apparatus therefor.

Heretofore, the purification and filtering of solutions and the removal of the coarse-grained particles of pigment and similar substances have generally been carried out by means of screening the solutions. As those skilled in the art know, this conventional procedure was connected with great disadvantages and difficulties, particularly due to the fact that the orifices or holes of the screens were quickly clogged and required frequent cleaning or replacement. When it was desired to filter thin-flowing solutions containing pigments, such as, for example, coating lacquers, screens up to 8000 meshes per square centimeter frequently had to be used. A screen of this type can reliably remove particles or grains as small as about $\frac{1}{16}$ millimeter in diameter. However, screens of this character and dimensions were rather expensive and had but very little structural strength. Also these screens would frequently break or tear without the failure's being noticed, whereby the filtering efficiency became highly problematical. These fine screens could not be employed for the filtration of thick-flowing masses, such as artificial leather masses. Therefore, in the filtration of viscous liquids or thick-flowing masses, it was necessary to employ much coarser screens, whereby the degree of filtration was greatly reduced. Although this filtration problem existed for a considerable length of time and various suggestions and proposals were made for the solution thereof, none, as far as is known, of these various suggestions and proposals was completely satisfactory and successful on a practical and industrial scale.

It has been discovered that the outstanding problem may be solved in a simple, positive and satisfactory manner.

It is an object of the present invention to provide a filtration process, particularly for the filtration of thick masses containing small solid particles, which is free from the disadvantages and inconveniences of conventional filtering processes.

It is another object of the invention to provide a filtering process which dispenses with the foraminous members, screens, sieves, and the like, of the conventional filtering processes and which employs a narrow gap or a plurality of such gaps instead.

It is a further object of the present invention to provide a filtering process relying on the filtering effect in a gap formed between two rotary bodies rotated at different speeds and having a circumferential displacement in opposite direction in the gap.

Still another object of the invention is to provide a filtering apparatus for carrying the process of the invention into practice.

The invention also contemplates a filtering apparatus involving a pair of rotary bodies having smooth or corrugated surfaces cooperating with each other and having a small space or gap therebetween for retaining the filtration residues.

It is also within contemplation of the invention to provide a novel and improved filtering apparatus which is simple in construction, easy and inexpensive to operate, and which may be manufactured and sold at a low price.

Other and further objects and advantages of the present invention will become apparent from the following description taken in conjunction with the accompanying drawings, in which—

Fig. 1 illustrates a vertical sectional view, somewhat diagrammatic in character, of a filtering apparatus embodying the principles of the present invention;

Fig. 2 depicts a similar view of a modified embodiment of the present invention;

Fig. 3 depicts a side elevational detail view, somewhat fragmentary, of the laminated filtering roll shown in Fig. 2;

Fig. 4 is a side elevational view of a pair of filtration rolls having serrated circumferential surfaces;

Fig. 5 is a top elevational view, also fragmentary, of the rolls shown in Fig. 4;

Fig. 6 illustrates a side elevational view of a pair of filtration rolls embodying the invention and having a laminated character;

Fig. 7 depicts a top elevational view, somewhat fragmentary, of the rolls shown in Fig. 6;

Fig. 8 shows a side elevational view of a laminated filtration roll of a modified character;

Fig. 9 is a top elevational view, somewhat fragmentary, of the roll shown in Fig. 8 and of the comb-like scraper member cooperating therewith;

Fig. 10 illustrates a vertical sectional view, somewhat diagrammatic in character, of a filtering apparatus embodying a roll of laminated character;

Fig. 11 depicts a similar view of a filtering apparatus embodying the invention and having a pair of laminated rolls cooperating with each other incorporated therein;

Fig. 12 shows a vertical sectional view, having parts in elevation, of a further modified embodiment of the invention involving a series of cooperating filtering rolls of laminated character; and Fig. 13 is a similar view of a modified embodiment of the invention having a series of smooth-faced filtering rolls incorporated therein.

Broadly stated, according to the principles of the present invention, screens, sieves, filtering cloths and other foraminous members are dispensed with, and the purification and filtration of the solutions to be treated are accomplished by passing the solutions through a narrow gap which is capable of retaining the impurities. The narrow gap is preferably formed by means of two bodies, each of which is defined by a surface of revolution, such as, for example, two rolls having smooth cylindrical surfaces arranged in parallel spaced relationship to form a narrow gap therebetween. Instead of smooth rolls, it is also possible to employ cooperating rolls having serrated or grooved surfaces, whereby the gap or gaps may have an accentuated length, and an increased filtering efficiency may be obtained. Likewise, it is also possible to employ rolls constituted of a plurality of plates arranged on a shaft in parallel spaced relationship and at such distances from each other that between the individual plates filtration gaps of predetermined dimensions are formed. These laminated rolls may be employed in combination with comb-like scrapers or may be arranged in cooperating positions with each other. The rolls or other rotation bodies are rotated at different velocities and in such sense that the circumferential displacement of cooperating rolls is in the opposite direction in the gap. A plurality of such filters or cooperating filtering rolls may be arranged in series or in cascade to obtain increased filtering efficiency and output, as those skilled in the art will readily understand.

Referring now more particularly to Fig. 1 of the drawings, a preferred embodiment of the invention is illustrated. The filtering apparatus essentially comprises an upper tank or hopper 1 holding a body of liquid 2 to be filtered therein. The lower end of tank 1 is closed by means of a pair of filtration rolls 3 and 4 rotatably mounted in parallel spaced relationship and having a narrow gap 5 therebetween through which filtered liquid may flow during the operation of the device. Underneath rolls 3 and 4 is provided a second tank 6 for receiving the filtered and purified liquid. Rolls 3 and 4 are rotated at different velocities, roll 4 being rotated much faster than roll 3. In addition, the rolls are rotated in the same sense so that the cylindrical surfaces of the rolls move in opposite direction in the gap, as is indicated by arrows 7 and 8. Due to the described rotation of the rolls, all impurities which are coarser than the gap or the distance between the surface of the rolls will be carried back by means of the faster roll 4 into the hopper and are scraped off from the roll by means of scraper 9. The purified and filtered solution will pass through the gap between the rolls and is scraped off from the circumferential surface of roll 3 by means of a scraper 10. In hopper 1, above the rolls, two guide plates 11 and 12 are preferably provided. Of these, the first guide plate 11 operates much in the same manner as a doctor blade and has the object of distributing the liquid on the surface of roll 3. This is very essential, especially in the case of thick flowing solutions. The second guide plate 12 has the object of preventing admixture of the solution returned by roll 4 into upper tank or hopper 1 with the untreated solution in said tank.

In the narrow channel 13 underneath guide plate 12, the separated solution is driven upwards by the rotation of roll 4 and is returned into the upper tank or hopper 1. The impurities would gradually accumulate in the upper tank were channel 13 not separated from the upper tank proper by means of a screen or foraminous partition wall 14. The only disadvantage of this arrangement resides in the frequent clogging of screen 14 by means of the thick-flowing liquid. Moreover, in view of the thick-flowing character of the liquid to be treated, this screen must have a very coarse mesh which greatly limits the degree of filtering. Therefore, it has been found that better operating results are obtained by means of the arrangement illustrated in Fig. 2.

As it will appear from the drawing, the filtering apparatus depicted in Fig. 2 shows all of the essential parts of Fig. 1, such as an upper tank 21, holding a body of liquid 22, a lower tank 26, a pair of cooperating filtering rolls 23 and 24 having a small gap 25 therebetween and rotated in the directions indicated by arrows 27 and 28. Likewise, rolls 23 and 24 are provided with scrapers 30 and 29, respectively, and with guide plates 31 and 32 which have the same arrangement and the same function as in Fig. 1. The novel element of this combination is roll 35 constituted of thin and round plates 36 which are spacedly mounted on a shaft 37 at a distance from each other corresponding to the desired degree of filtration. The solution returned into channel 33 is forced into the intervals of plates 36. Coarse grained impurities will get caught in the circumferential portions of the plates, will be removed by scraper member 38 and will be collected in compartment 39. The filtered solution retained in the intervals between the individual plates is removed by means of a comb-like scraper 40. In this manner it is possible continuously to filter any desired quantities of a unitary solution without any interruptions. All that is necessary is to remove the accumulated impurities from time to time from compartment or cell 39.

Instead of cylindrical rolls having smooth circumferential surfaces, it is also possible to employ rolls having various grooved surface formations provided in such manner that the corresponding portions of the grooves of one roll conform to similar portions of the other cooperating roll. Thus, Figs. 4 and 5 illustrate cooperating rolls 41 and 42 having serrated surfaces which are rotated in the directions of arrows 43 and 44, respectively. A small gap 45 is provided between the two rolls for the passage of the filtered liquid. Scrapers 46 and 47 having profiles corresponding to the faces of rolls 41 and 42 cooperate with the filtration rolls, as described above.

A similar modification is depicted in Figs. 6 and 7. In this modification, a plurality of plates 61 separated from each other by means of members 62 are provided on a shaft 63, and form a filtration member 64. A similar combination of a shaft 65, plates 66 and members 67 provides a second filtration member 68, adapted to cooperate with the first one and to provide a long, zig-zag shaped filtration gap 69, similar to gap 45 of Figs. 4 and 5. The two filtration members are rotated in the direction of the arrows 70 and 71, and their operation will be readily understood by those skilled in the art without any further explanation. The advantage of the filtration members shown in Figs. 4 and 5, and in Figs. 6 and 7 resides in the accentuated length of the filtration gap, whereby a greater output of filtered liquid may be obtained in the same unit of time.

The filtering members shown in Figs. 8 and 9 are a further development of the basic inventive concept. In this case a rotatable body or filtration member 81 is provided which is integrally formed of a single piece of metal having deep grooves provided therein for example by means of turning. These grooves are fine enough to provide a filtering effect of their own and to retain particles which are coarser than the dimensions of the grooves. Filtration members of this type may also be provided by mounting a plurality of thin, circular plates 82 on a shaft 83 in parallel spaced relationship. The correct and accurate spacing of these plates is best ascertained by means of suitable separating disks or washers 84 interposed between successive plates. Scrapers 85 and 86 of suitable form cooperate with filtration member 81 rotated in the direction of arrow 87. Regardless of their method of manufacture, filtration rolls or members of this type will be referred to in the following as "laminated rolls" or "laminated filtration members."

The application of laminated filtration members provides a number of novel and highly effective combinations which are considerably different from the filtering apparatus described above. The simplest form of a filtering apparatus embodying a laminated filtration member is illustrated in Fig. 10. An upper container 101 is provided for holding the liquid 102 to be filtered, its bottom portion being closed by means of a laminated filtration roll 103, so that the liquid has to pass to the interspaces between the individual plates of the roll. By means of the rotation of laminated roll 103 in the direction of arrow 104, and due to the gradual narrowing of flow channel 105, the solution is forced into the interspaces between the individual plates. All impurities which are larger in size than these intervals between the plates are deposited on the circumference of the laminated roll and would quickly clog all of the interspaces were it not for the scraper 106 which continuously removes these deposits. Scraper 106 is provided with short, hooked teeth which extend a few millimeters into the interspaces in order to remove also the impurities deposited therein. In this manner, all of the impurities are accumulated in a compartment or cell 107 from which they may be removed from time to time. The other side of laminated roll 103 is completely closed by means of a laminated or comb-like scraper 108 which extends into the interspaces of the individual plates up to the shaft whereby the filtered liquid filling out said interspaces may be completely removed. The removed filtered solution flows into a tank 109 provided in the lower portion of the filtering apparatus. During the rotation of laminated roll 103 a partial vacuum would be produced above the roll which has to be filled out by the continuous streaming of fresh liquid into the interspaces of the laminated roll. In other words, a powerful suction effect is exerted on the liquid above the filtration roll and further promotes the filtration process. Instead of providing a compartment or cell 107 for the storage of the separated impurities and of a slight portion of the solution removed together with the impurities, it is also possible to pass this removed portion of the liquid into a second filtering device (not shown) having a laminated filtering roll. In this case, the filtering process may be carried out in a completely continuous manner and without any interruption. This second laminated roll filter may be completely identical in construction with the first one. Instead of the laminated filtering rolls, it is also possible to employ metal brush rolls in which case, of course, the scrapers and stripper devices have to be modified accordingly. However, the degree of filtering obtainable with this type of brush rolls is highly uncertain, and the wear on the brush rolls is very great in practical operation. Moreover, it cannot be completely avoided that parts of the wire forming the brush rolls break off and contaminate the filtered and treated solution.

Fig. 11 illustrates a modified arrangement in a laminated roll filter embodying a pair of laminated rolls. This filtering apparatus comprises an upper container or tank 111, which is closed at the bottom thereof by a pair of laminated filtration rolls 112 and 113, arranged in such cooperating position that the plates of each filtration roll extend into the interspaces of the other and displace the filtered solution from said interspaces. Laminated filtration rolls 112 and 113 are rotated in the direction of arrows 114 and 115, the impurities retained close to the circumference thereof being removed by means of laterally arranged scrapers 116 and 117 and are deposited in compartments 118 and 119. In the central portion of the liquid body above the two laminated rolls a strong suction effect is exerted, the same as in the embodiment described in the foregoing and illustrated in Fig. 10. The filtered solution is discharged into a lower container or tank 120, located underneath rolls 112 and 113.

Fig. 12 illustrates a further modified embodiment of the invention in which a series of laminated filtration rolls are provided in series or cascade operation. The filtering apparatus comprises a casing 121 having a container 122 for the liquid to be filtered and a container 123 for the filtered liquid and is supported by means of a cast iron or similar frame 124. A plurality of laminated filtration rolls 125 are rotatably mounted in parallel spaced relationship within casing 121 in such a manner that the plates are extending into the interspaces of the adjoining filtration rolls to a limited extent, preferably only to the extent of a few millimeters. All of the rolls are rotated in the same sense, as indicated by arrows 126. During the operation of the device, the liquid to be filtered is introduced into the interspaces of the first filtration roll from the container 122. The impurities are subsequently transferred from one roll to the others and the deposits on the circumferential portions of the rolls are gradually enriched in impurities. By suitable adjustment of the feed of fresh liquid to be filtered to the first filtration roll, it may be easily accomplished that the impurities practically free from liquid may be stripped off from the last roll by means of a scraper 127 and may be deposited in a compartment 128. Scrapers or stripper blades 129 of suitable form are provided for each of the rolls for displacing the filtered liquid from the interspaces of the plates of the laminated rolls. A positive suction effect is exerted on the space above the rolls by means of the operation of stripper or scraper members 129.

Fig. 13 illustrates an embodiment in which a series of smooth filtration rolls is employed. The filtering apparatus of Fig. 13 is very similar to the one shown in Fig. 12 and comprises a casing 131, an upper container 132 for the liquid to be filtered, and a lower container 133 for the filtered liquid. Casing 131 is supported by means of a frame 134. Within the casing, a plurality of smooth surfaced filtration rolls 135 are rotatably mounted in parallel spaced position, a small gap 136 corresponding to the desired degree of filtration being provided between each pair of adjoining rolls. As is indicated by arrows 137, all of the rolls are rotated in the same sense. The feed of liquid to be filtered from upper container 132 is so adjusted that the solution is only sufficient for filling out the first intervals between the rolls, whereas the last is filled only to a very limited extent. Therefore, coarse grained impurities will be gradually transferred to and will accumulate on the last roll wherefrom they may be stripped by means of a scraper member 138 and may be withdrawn into a compartment 139. The filtered solution is removed from the individual rolls by means of scrapers 140 and accumulates in lower container 133. Guide plates 141 may be provided above the surface of each roll in order to cause better distribution of the liquid on the surface of the roll.

The output of a filter of the described character is quite considerable. Assuming that there are 6 rolls employed, each having 1 square meter of circumferential surface, and arranged to provide gaps of 0.1 millimeter, this arrangement is capable of delivering 1 cubic meter of filtered solution in 50 minutes at 50 revolutions of the rolls per minute, regardless of whether thick-flowing or thin-flowing liquids are to be filtered. The distance of 0.1 millimeter between the adjoining rolls corresponds to a screen having 5000 meshes per square centimeter. The filtration of thick flowing liquids to such a considerable extent was heretofore completely impossible.

Although the present invention has been described in connection with a few preferred embodiments thereof, variations and modifications may be resorted to by those skilled in the art without departing from the principles of the present invention. Thus, laminated rolls may be employed in cooperating combinations with smooth rolls. The rolls may be arranged in various different relative positions, the flow of the liquid to be filtered may be directed downwards or upwards, according to the particular case contemplated. Guide plates, scrapers and strippers of many different types may be employed. All of these variations and modifications, however, embody the same principle of the invention; to wit: the continuous filtration through gaps which are formed between or in rotation bodies and involving continuous removal of the impurities by rotating said body and by means of stripper and scraper members.

The process and the apparatus of the invention may be employed for filtrations of all descriptions. The novel filtration process is of especial importance and value for the filtration of thick-flowing liquids which heretofore could not be filtered in a satisfactory manner on an industrial scale, such as artificial leather masses and the like, and masses produced in kneading machines for various purposes.

I claim:

1. The process of filtering solutions which comprises establishing at least one filtration gap between the circumferential surfaces of at least one pair of rotation bodies, passing a liquid to be filtered through said gap, causing rotation of said surfaces in the same sense and in opposite direction in the gap, removing filtered liquid from one of said surfaces, and removing filtration residues from the other of said surfaces.

2. The process of filtering solutions which comprises establishing a filtration gap between a pair of rotary surfaces, passing a liquid to be filtered through said gap, causing rotation of said surfaces in the same sense and in opposite direction in the gap, removing filtered liquid from the surface moving in the direction of flow of the liquid in said gap, and removing filtration residues from the other of said surfaces moving in the opposite direction in said gap.

3. The process of filtering solutions which comprises establishing a filtration gap between a pair of rotary surfaces, passing a liquid to be filtered through said gap, causing rotation of said surfaces in the same sense and in opposite direction in the gap, the surface rotated against the flow of liquid in the gap having a considerably greater velocity, removing filtered liquid from the slower moving surface, and removing filtration residues from the faster moving surface.

4. The process of filtering solutions which comprises establishing a filtration gap adapted to retain impurities of predetermined size between a pair of smooth rotary surfaces, passing a liquid to be filtered through said gap, causing rotation of said surfaces in the same sense and in opposite direction in the gap, removing filtered liquid from the surface moving in the direction of flow of the liquid in said gap, and removing filtration residue from the other of said surfaces moving in the opposite direction in said gap.

5. The process of filtering thick-flowing masses which comprises establishing a filtration gap between a pair of rotary bodies, said gap having dimensions corresponding to the desired degree of filtration, passing a thick-flowing mass to be filtered through said gap, rotating said rotary bodies at predetermined relative velocities having at least one of said bodies rotating in a direction opposite to that of the mass in the gap, removing filtration residues from said rotary body at a point above said gap, and removing filtered mass from the surface of the second rotary body whereby said filtration gap is formed by the cleaned surfaces of said bodies and remains permanently open and free from impurities.

6. In an apparatus for filtering liquids, the combination comprising a pair of rotary bodies rotatably mounted in parallel spaced relationship to form a filtration gap, means for feeding liquid to be filtered to said filtration gap, means for rotating said bodies at a predetermined rate and having at least one of said bodies rotating in a direction opposite to that of said liquid in said gap, means for removing filtration residues from said rotary body above said gap, and means for removing filtered liquid from the surface of the other body below said filtration gap.

7. In an apparatus for filtering liquids, the combination comprising a pair of cylindrical filtration bodies rotatably mounted in parallel spaced relationship to form a filtration gap, means for feeding liquid to be filtered to said gap, means for rotating said bodies in the same sense and in opposite direction in said gap, means for removing filtered liquid from the filtration body moving in the direction of the flow of liquid in said gap, and means for removing filtration residues from the other of said surfaces moving in the opposite direction in said gap.

8. In an apparatus for filtering liquids, the combination comprising a pair of cylindrical filtration rolls rotatably mounted in parallel spaced relationship to form a filtration gap, means for feeding liquid to be filtered to said gap, means for rotating said rolls in the same sense and in opposite direction in said gap, the roll rotated against the flow of liquid in the gap having a considerably greater velocity, means for removing filtered liquid from the surface of the slower filtration roll, and means for removing filtration residues from the surface of the faster filtration roll.

9. In an apparatus for filtering liquids, the combination comprising a pair of cylindrical filtration rolls rotatably mounted in parallel spaced relationship to form a filtration gap, means for feeding liquid to be filtered to said gap, means for rotating said rolls in the same sense and in opposite direction in said gap, the roll rotated against the flow of liquid in the gap having a considerably greater velocity, means for removing filtered liquid from the surface of the slower filtration roll, means for removing filtration residues from the surface of the faster filtration roll, and guide plates cooperating with said filtration rolls above said gap to distribute said liquid on the surface of said slower roll and to prevent contamination of the liquid to be filtered with the filtration residues returned by said faster roll.

10. In an apparatus for filtering liquids, the combination comprising a pair of filtration rolls having serrated circumferential surfaces rotatably mounted in parallel spaced relationship and adapted to cooperate with each other to form a filtration gap of accentuated length, means for feeding liquid to be filtered to said gap, means for rotating said rolls in the same sense and in opposite direction in said gap, the roll rotated against the flow of liquid in the gap having a considerably greater velocity than the other, means for removing filtered liquid from the surface of the slower filtration roll, and means for removing filtration residues from the surface of the faster filtration roll.

11. In an apparatus for filtering liquids, the combination comprising a pair of filtration rolls having grooved circumferential surfaces of an interlocking character rotatably mounted in parallel spaced relationship and adapted to cooperate with each other to form a filtration gap of accentuated length, means for feeding liquid to be filtered to said gap, means for rotating said rolls in the same sense and in opposite direction in said gap, the roll rotated against the flow of liquid in the gap having a considerably greater velocity than the other, means for removing filtered liquid from the surface of the slower filtration roll, and means for removing filtration residues from the surface of the faster filtration roll.

12. In an apparatus for filtering liquids, the combination comprising a plurality of filtration rolls rotatably mounted in parallel spaced relationship to form a filtration gap between each pair of adjoining rolls, means for feeding liquid to be filtered to the first one of said gaps, means for rotating all of said rolls in the same sense and in opposite direction in the respective gaps to cause transfer of filtration residues from each roll to the next one along the series, means for permanently removing said residues from the last roll of the series, and means for removing filtered liquid from the under face of each of said rolls.

CARL MÜNCH.